Patented June 17, 1930

1,763,882

UNITED STATES PATENT OFFICE

SANDFORD S. COLE, OF PITTSBURGH, PENNSYLVANIA, ASSIGNOR TO THE KOPPERS COMPANY, A CORPORATION OF DELAWARE

REFRACTORY PRODUCT

No Drawing.   Application filed February 23, 1927.   Serial No. 170,436.

This invention relates to refractory patching cements, mortars and the like that are adapted to be applied to refractory masonry surfaces or interstices therein for the purpose of patching, joining or repairing the same, preventing leakage of gas, and the like.

An object of my invention is to provide a refractory product of high strength and bonding qualities especially at moderately elevated temperatures.

A further object of my invention is to provide a refractory product that may be distinguished from other refractories to which it may be applied.

A further object of my invention is to provide a refractory product having a definite color change according to the temperatures to which it is heated and whereby such temperatures may be roughly estimated when said refractory material has cooled.

I have found that incorporation of certain cyanide compounds of iron in refractory cements, particularly cements substantially entirely composed of silica or silica and small amounts of fluxing agents, operates to increase the strength of the product. This increase in strength is particularly noticeable and important at moderately high temperatures, such as from about 800° C. to 1000° C., and may amount to an increase in strength of 20% or more. Furthermore, the bonding qualities of the cement are similarly improved.

The cyanide compound which I prefer to use is Prussian blue, but other cyanide compounds of iron may be used. Prussian blue may be used in amounts ranging from about 0.05% to about 0.5%, but about 0.2% is preferable. However, the exact percentages to be used will depend upon the nature of results desired. While my cement may be composed substantially entirely of silica and Prussian blue, I prefer to incorporate into the mixture a fluxing agent, such as borax. A preferred example of such cement is as follows:

97.8% silica cement.
   0.2% Prussian blue.
   2% borax.

The use of such highly colored compound as Prussian blue in refractory cements results in corresponding coloration of the product. This color may be changed but is never entirely destroyed by firing and, consequently, the product will retain a coloration, even after firing. This coloration serves to distinguish the material of my invention from other refractory products to which it may be applied. This property gives the cement an important application to patching operations where it is desired to ascertain definitely the amount and extent of patching after the refractory wall or the like has cooled.

I have found that my cement undergoes a more or less definte color change at moderately high temperatures, varying somewhat according to the amounts of Prussian blue which may be present therein. For example, one cement containing a relatively large amount of Prussian blue, when heated to about 800° C. and cooled, has a gray color. The same cement, when cooled after being heated to about 1000° C., has a red color. Thus a definite color change takes place between 800° C. and 1000° C. The temperature range at which this color change occurs varies for cements of different composition.

Such cement containing fluxing material is particularly adapted to be used within a moderate temperature range of about 800° C. to 1000° C., and, if it were used in regions of high temperatures, it would fuse and be worthless. The incorporation of Prussian blue in such cement, aside from increasing the strength thereof, provides a more or less definite index of the temperature to which the refractory has been subjected. Consequently, if cement sold and intended to be used for application to only moderately hot materials were applied by the customer to materials or places considerably above such temperatures, its color, after cooling, would indicate that the cement had been used at temperatures for which it was never intended. The advantages of having such an index of the temperature range to which the refractory product may be heated will be obvious from the foregoing description.

My invention is not limited to the specific example given hereinabove, for Prussian blue may be advantageously incorporated into any refractory product, before firing. My invention is, however, particularly adapted to cements, mortars or refractories intended for use at moderately high temperatures.

While I do not limit myself to the preferred example given hereinabove, my product is particularly useful for use as a joining or patching material at moderately high temperatures and possesses increased strength and bonding quality as well as the temperature index which I have explained hereinabove and a color which distinguishes it from other refractories to which it may be applied.

I claim as my invention:

1. A refractory product containing a refractory base material and a cyanide compound of iron in admixture therewith.

2. A refractory cement containing a refractory base material and Prussian blue in admixture therewith.

3. A refractory cement containing a refractory base material and from about 0.05% to 0.5% of Prussian blue in admixture therewith.

4. A refractory cement containing ground silica and Prussian blue in substantially uniform admixture.

5. A refractory product comprising a substantially uniform mixture of silica, fluxing material and Prussian blue.

6. A refractory cement comprising a mixture of silica, borax, and Prussian blue.

7. A refractory cement containing approximately 97.8% silica, 0.2% of Prussian blue and 2% of borax.

In testimony whereof I have hereunto subscribed my name this 21 day of February, 1927.

SANDFORD S. COLE.